N. H. FOOKS.
PROCESS OF HEAT TREATING FOODS OR OTHER SUBSTANCES.
APPLICATION FILED OCT. 29, 1919.
1,331,337. Patented Feb. 17, 1920.
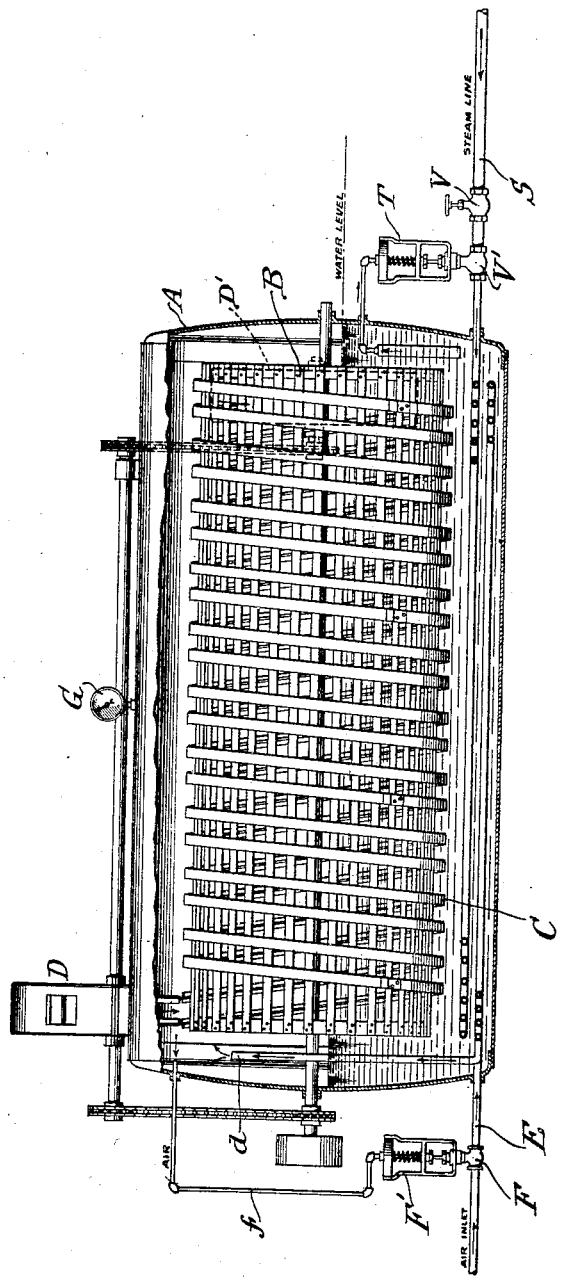
Inventor
Nelson H. Fooks

UNITED STATES PATENT OFFICE.

NELSON H. FOOKS, OF MOUNT AIRY, MARYLAND.

PROCESS OF HEAT-TREATING FOODS OR OTHER SUBSTANCES.

1,331,337.   Specification of Letters Patent.   Patented Feb. 17, 1920.

Application filed October 29, 1919. Serial No. 334,280.

*To all whom it may concern:*

Be it known that I, NELSON H. FOOKS, a citizen of the United States, residing at Mount Airy, in the county of Carroll and State of Maryland, have invented certain new and useful Improvements in Processes of Heat-Treating Foods or other Substances; and I do hereby declare the following to be a full, clear, and exact description of the invention, such as will enable others skilled in the art to which it appertains to make and use the same.

This invention for which I seek a patent relates to processes of heat treating, particularly liquid-sterilizing and cooking, and especially concerns sterilizing and cooking food substances, contained in sealed cans or other containers, by submerging them in heated fluids.

In sterilizing and cooking with hot water or steam where temperatures higher than 212° F. are required it is necessary to carry out the process in retorts, or other fluid tight containers.

My process involves the treatment of substances in fluid-tight containers in the presence of water or other liquid heated to a temperature above its boiling point in the atmosphere of the particular locality in which the treatment is to be applied, while ebullition, or boiling of the liquid is prevented by air or other non-condensable gas within the chamber, maintained under a pressure sufficient to achieve that result.

More specifically my process is of the sort commonly characterized as continuous; and it is a purpose thereof to subject bodies in succession, and while in substantially continuous motion, to heat treatment within a closed vessel containing a liquid, such as water, heated to a temperature above its boiling point at the external atmospheric pressure of the particular locality in which the process is to be practised, while at the same time preventing ebullition by pressure of a fixed gas, such as air, upon the liquid within the vessel, the gas being maintained at a pressure higher than that of the atmosphere surrounding the vessel, and sufficient to prevent ebullition at the desired temperature.

In the prior practice of cooking and sterilizing within fluid tight containers under relatively high temperatures and pressures, the pressure required to maintain the desired high temperature has been produced by steam. When it is attempted to carry on a continuous sterilizing and cooking process in a closed vessel or retort containing steam under pressure by successively feeding into and moving the bodies through the container and out, steam escapes when the objects to be treated are inserted and removed from the container, resulting in inconvenience and loss of efficiency.

By my process loss of energy, and inconvenience due to escape of steam through the ports of entrance and discharge, as they are opened to admit and discharge the bodies under treatment, are largely eliminated.

The accompanying drawing illustrates diagrammatically a type of apparatus adapted to be used in the practice of my process.

In the drawing A indicates a fluid-tight vessel or container, B a revoluble frame having a series of parallel slats or shelves on its periphery adapted to receive cans and permit them to shift endwise and longitudinally of the frame. C is a spiral track-way fixed with respect to the container and adapted to be engaged by the cans. By the coaction of the revoluble can-carrying-frame B and the spiral pathway C, cans received on the frame may be caused to travel from end to end of the container in a spiral course of considerable extent, the cans at the same time rolling so as to shift or agitate their contents in order to facilitate thorough and uniform heating. D represents a rotary pocket-valve of any suitable type adapted to feed the cans into the container A onto the carrying frame B. D' represents a rotary pocket valve adapted to discharge the cans from the container A. E represents a pipe affording communication from a source of compressed air (not shown) to the interior of container A. The pipe E is arranged to pass into the lower portion of the vessel, normally containing heated water, and may comprise coils or zigzags adapted to interchange heat between the water and the air in the pipe. The inner end of the pipe is arranged to discharge into the vessel above the normal water level as shown at *d*, whereby the air discharged into the space above the water will be approximately of the same temperature as the water. F is an automatic valve for controlling the flow of compressed air, which is controlled by a pressure regulating device F' responding to air pressure within the vessel communicated through the small pipe *f*. G is a pressure gage for indicating the degree of air pressure within the vessel.

S is a pipe communicating with a steam generator (not shown) and with a steam heating coil or piping within the lower portion of the tank. V is a hand regulating or cut off valve. V' is an automatic valve controlled by a thermostat T and arranged to respond to changes of temperature of the water and regulate the temperature thereof.

In carrying out my process with an apparatus of the sort described, it is possible to maintain any desired air pressure above normal atmospheric.

The container A may be filled to any desired level with water, and the water heated to a temperature governed by the thermostat, which will be set to respond to the degree of heat desired in the water. The air pressure in the tank A, above the water, may be regulated by the pressure regulator or otherwise to a degree sufficient to suppress boiling, or ebullition, at the desired temperature and the consequent evolution of large quantities of steam.

I have illustrated and prefer to use thermostatic and pressure regulating devices of a well known type now on the market, and made by the Tagliabue Manufacturing Company, but obviously any suitable heat-responsive regulator for the steam and any suitable pressure regulator for the air or other gas can be used, the specific form of regulators being no part of my invention.

By maintaining a pressure of air or other fixed gas upon a body of water within a fluid tight container, it will be seen that the conditions are somewhat the same as in boiling water in the open air where the limit temperature of the boiling point is reached at 212° F. under atmospheric pressure at sea level. But by increasing the air pressure, as in my process, the limit temperature of the boiling point may be raised above 212° F. By way of illustration, by creating an air pressure of 20 pounds above the normal atmosphere in a closed chamber over a body of water, which air pressure can be maintained uniform by a suitable pressure regulator or safety valve set in the air supply line, or upon the chamber, it is obvious that steam may be admitted and heat the water to any desired temperature until the boiling or ebullition point of the water established by the said 20 pounds pressure above normal atmospheric now upon it is reached. And by using a thermostatic regulator, as shown, the flow of steam to heat the water can be checked when the temperature of the water has reached any desired degree and be held at that point. For example, the thermostat might be set to close the steam valve at 230° F. and would check the flow of steam, when the water became heated to that temperature, until the temperature of the water began to lower, when the thermostat would act to admit more steam, thus tending in the well known manner of such devices to keep the temperature at 230° F.

By my process a minimum quantity of vapor will be formed above the body of water, and will more or less saturate the air contained in the chamber; but vapor will not exist in quantities sufficient to be objectionable, as is the case when steam is employed to produce the necessary pressure upon the water and is of necessity discharged from the container while the objects being processed are being received into and discharged from the container. The greater portion of the waste at the intake and discharge valves will necessarily be air supplied to the container, which can be supplied on a very economical basis compared with steam.

Having secured the desired temperature and air pressure within the sterilizing and cooking vessel by properly setting the regulators, and having started the apparatus to working, cans of food or other objects to be subjected to the desired heat treatment, are fed in succession to the inlet valve and delivered in succession on to the rotary frame B at one end, the frame by its rotary movement rolling the cans or other objects spirally from end to end of the tank or container and finally delivering them into the outlet valve, whereby the objects are finally discharged thoroughly processed. Substantially no steam escapes from the pockets of the rotary valves since evolution of steam is minimized by air pressure and only air dampened with water vapor escapes therethrough.

Although I have illustrated a cylindrical retort of the general type shown in patent to Smith #640234, as an instrumentality for practising my process, it is obvious that an apparatus of any known type adapted to retain pressure within it and at the same time provide for the admission and discharge of objects to be processed may be used, and similarly secure the advantages of my process.

Thus by substituting a fixed gas and liquid in the chamber for steam, or steam and water, the treating fluid within the chamber may be maintained at the desired high temperature and the losses of heat-energy and serious inconvenience due to the fogging of the work rooms and wetting of the surroundings by the discharge of large quantities of steam and vapor, at the ports of entrance and exit of the container, that would otherwise occur, are largely avoided.

Having described my process in the best manifestation thereof now known to me, I claim as my invention:

1. A process of heat-treating substances which consists in heating liquid partially filling a fluid-tight container, to a desired temperature higher than the boiling point of said liquid in the atmosphere surrounding the container, preventing ebullition of the liquid by forcing into the container a fixed gas maintained within the container under pressure exceeding the pressure of atmosphere surrounding the container and while maintaining said temperature and pressure, continuously feeding the substances to be treated into the container through the gas space into the liquid, and out of the liquid through the gas space out of the container, substantially as described.

2. A process of heat treating bodies which consists in heating water partially filling a fluid-tight container to a temperature higher than the boiling point of water in the atmosphere surrounding the container, preventing ebullition of the water by forcing air into the container under pressure exceeding the pressure of the external atmosphere surrounding the container, and, while maintaining the said temperature and pressure, continuously feeding bodies to be treated into the container through the air space into the water, and out of the water through the air space out of the container, substantially as described.

3. A process of heat-treating a substance which consists in heating liquid partially filling a fluid-tight container to a temperature higher than the boiling point of said liquid in the atmosphere surrounding the container, preventing ebullition of the liquid by introducing a fixed gas maintained under pressure exceeding the pressure of the atmosphere surrounding the container, and, while maintaining said temperature and pressure, inserting the substance to be treated into the container through the gas space into the liquid, and removing it from the liquid through the gas space and thence out of the container.

4. The process of heat-treating a substance which consists in heating water in a container to a desired temperature higher than the boiling point of water in the atmosphere surrounding said container, introducing air into the container above the water and maintaining it at a pressure sufficient to prevent ebullition at said desired temperature, and, while maintaining said temperature and pressure, introducing the substance to be treated into the water through the air space, and removing it out of the water through the air space and out of the container.

In testimony whereof I affix my signature.

NELSON H. FOOKS.